(12) United States Patent
Johnson

(10) Patent No.: US 10,156,735 B2
(45) Date of Patent: *Dec. 18, 2018

(54) DUAL-FOLDING EYEGLASSES AND EYEGLASS COLLAPSIBLE CASE

(71) Applicant: Microvision Optical LLC, San Diego, CA (US)

(72) Inventor: David A. Johnson, Solana Beach, CA (US)

(73) Assignee: MICROVISION OPTICAL, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,218

(22) Filed: Nov. 21, 2017

(65) Prior Publication Data

US 2018/0095294 A1   Apr. 5, 2018

Related U.S. Application Data

(63) Continuation-in-part of application No. 15/400,867, filed on Jan. 6, 2017, which is a continuation of application No. 14/984,545, filed on Dec. 30, 2015, now Pat. No. 9,541,771.

(60) Provisional application No. 62/119,268, filed on Feb. 23, 2015.

(51) Int. Cl.
*G02C 5/08* (2006.01)
*G02C 5/22* (2006.01)
*G02C 5/10* (2006.01)
*G02C 5/00* (2006.01)

(52) U.S. Cl.
CPC ............ *G02C 5/2263* (2013.01); *G02C 5/006* (2013.01); *G02C 5/10* (2013.01); *G02C 2200/28* (2013.01)

(58) Field of Classification Search
CPC ............ G02C 5/006; G02C 5/08; G02C 5/22
USPC ................. 351/63, 118, 119, 111; 2/454
See application file for complete search history.

(56) References Cited

U.S. PATENT DOCUMENTS

| | | |
|---|---|---|
| 4,820,035 A | 4/1989 | Kanda |
| 5,028,126 A | 7/1991 | Takeuchi |
| 5,187,504 A | 2/1993 | Kanda |
| 5,208,616 A | 5/1993 | Chang |
| 5,231,429 A | 7/1993 | Kanda |
| 5,448,317 A | 9/1995 | Huang |
| 5,473,395 A | 12/1995 | Huang |
| 5,638,146 A | 6/1997 | Nannini |
| 5,640,218 A * | 6/1997 | Kanda ................. G02C 5/006 2/454 |

(Continued)

*Primary Examiner* — Hung Dang
(74) *Attorney, Agent, or Firm* — Procopio, Cory, Hargreaves & Savitch LLP

(57) ABSTRACT

Eyeglasses are provided for folding into a substantially flat configuration to be fitted inside a compact case. The eyeglasses include a frame surrounding a pair of lenses, and a pair of temples which extend from respective outer edges of the frame. A first hinge connection positioned on each temple allows outer parts of the pair of temples to be folded horizontally inwards from the unfolded configuration into a first folded configuration. Respective inner parts of the temples are rotatable downwards relative to opposite side edges of the frame about respective second hinge connections into a fully folded condition substantially coplanar with the frame. In some embodiments, the frame and tips or earpieces of the temples are of rigid plastic material while the temples and hinge connections are of metal.

18 Claims, 13 Drawing Sheets

(56) References Cited

U.S. PATENT DOCUMENTS

| | | | |
|---|---|---|---|
| 5,751,393 A | | 5/1998 | Yamazaki |
| 5,760,867 A | | 6/1998 | Pernicka et al. |
| 6,494,573 B1 | * | 12/2002 | Huang .................. G02C 5/006 2/454 |
| 6,513,926 B1 | | 2/2003 | Kizu |
| 7,070,273 B2 | | 7/2006 | Benavides et al. |
| 7,455,402 B2 | | 11/2008 | Gerber et al. |
| 9,541,771 B2 | * | 1/2017 | Johnson ............... G02C 5/2263 |
| 2011/0228210 A1 | | 9/2011 | Willett |

* cited by examiner

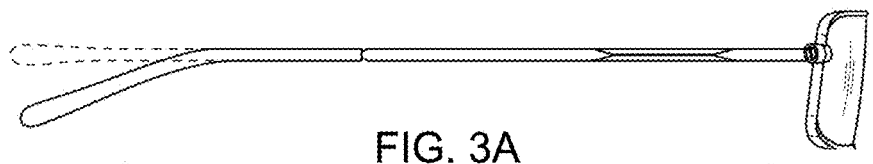
FIG. 3A
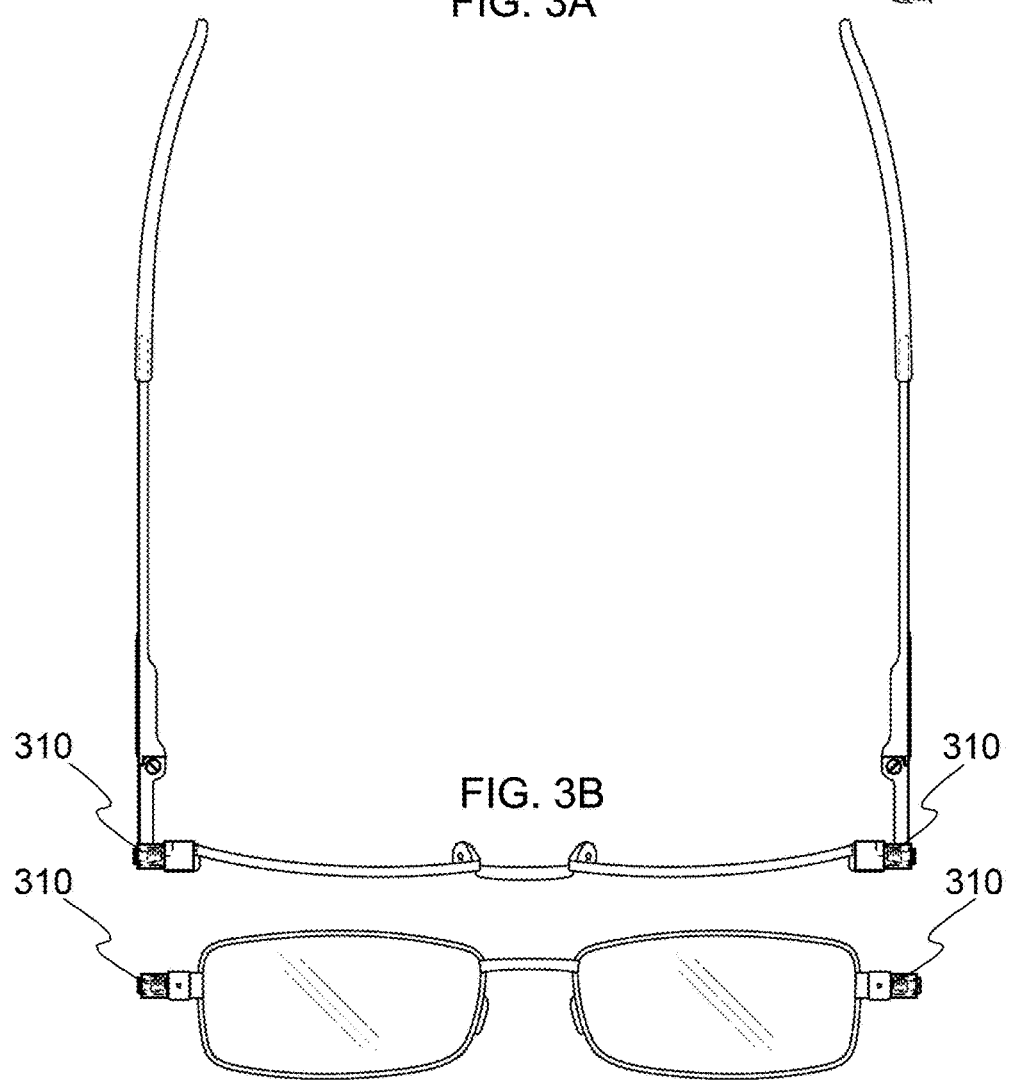
FIG. 3B
FIG. 3C
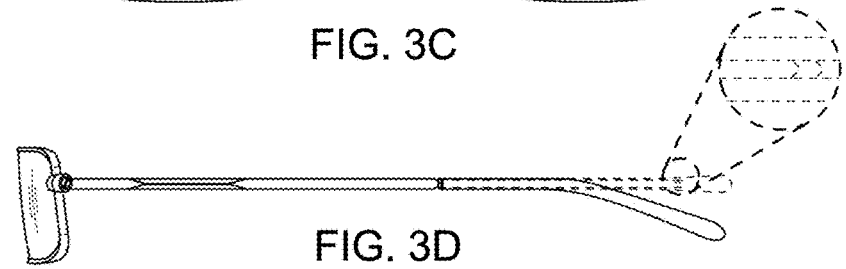
FIG. 3D

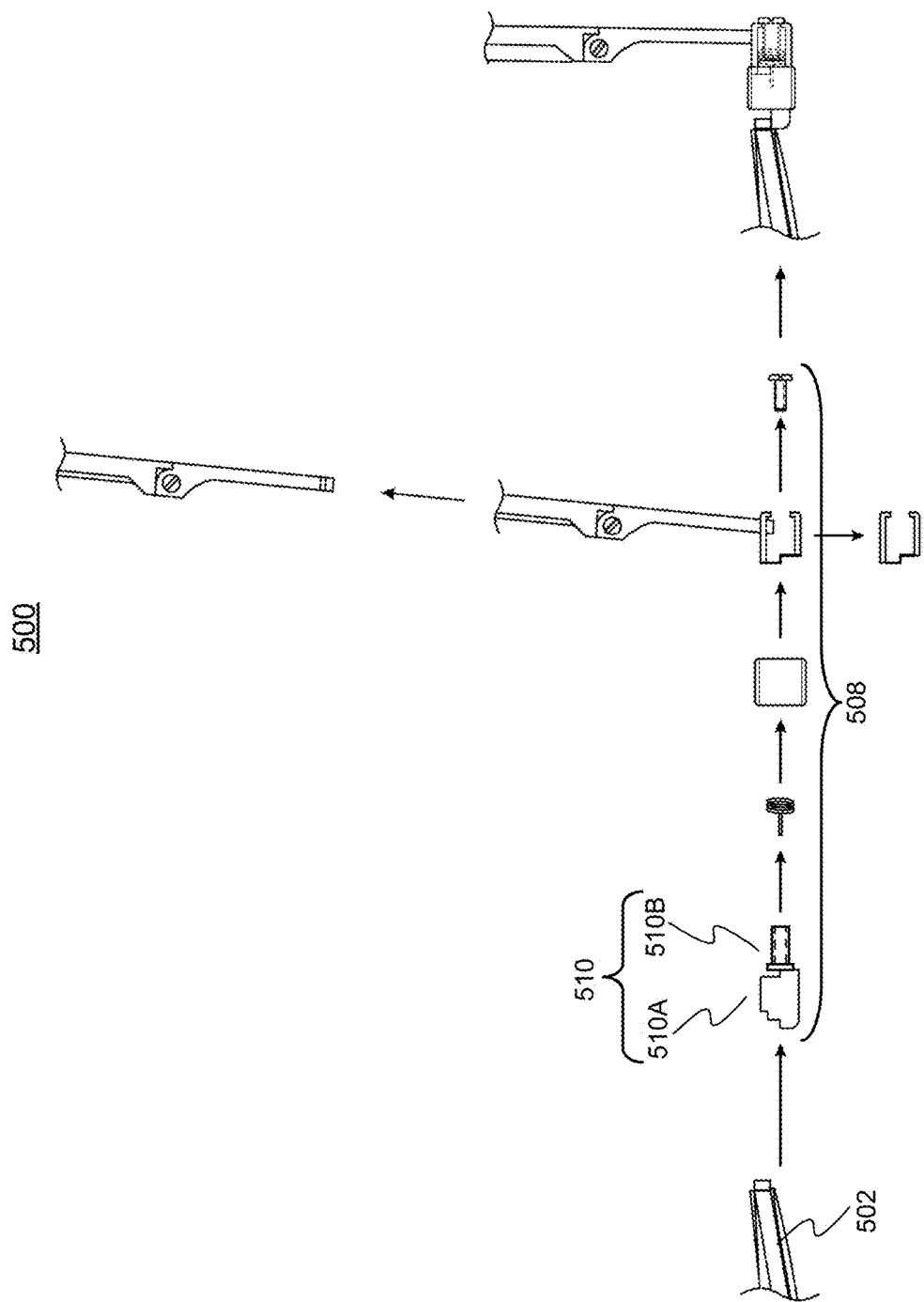

DUAL-FOLDING EYEGLASSES AND EYEGLASS COLLAPSIBLE CASE

PRIORITY CLAIM AND RELATED PATENT APPLICATIONS

This patent application is a continuation-in-part of U.S. patent application Ser. No. 15/400,867 filed on Jan. 6, 2017, now abandoned, which is a continuation of U.S. application Ser. No. 14/984,545, filed on Dec. 30, 2015, issued as U.S. Pat. No. 9,541,771 on Jan. 10, 2017, which claims priority to and benefits of U.S. Provisional Patent Application No. 62/119,268 filed on Feb. 23, 2015, and the disclosures of the foregoing applications are Incorporated herein by reference in their entirety as a part of this application.

TECHNICAL FIELD

This patent document generally relates to designs of eyeglasses and specifically to eyeglasses with multiple sets of hinges which can be folded into an ultra-compact configuration.

BACKGROUND

When not being worn, eyeglasses are generally folded at the temples via a pair of hinges near the frame of the eyeglasses that folds each temple horizontally toward the frame. This creates a smaller profile of the eyeglasses than when the eyeglasses are in their unfolded configuration to be worn by a user. However, this conventional folded configuration remains relatively thick and therefore also requires a relatively thick eyeglasses case for storage. Such an eyeglasses case is generally bulky and not easily stored on a person, such as inside a cloth pocket, or in a small personal bag.

Therefore, there is a need for eyeglasses designs which allow a pair of eyeglasses to be folded more compactly and fitted into a more compact case.

SUMMARY

Embodiments described herein provide for eyeglasses with multiple set of hinges for folding into a compact configuration, and more specifically to two pair of hinges which fold temples of the glasses both inward and downward such that they are configured to be collapsed into the compact configuration when a case is closed over the eyeglasses. Embodiments described herein further provide for eyeglasses with multiple sets of hinges for folding into a flattened, compact configuration in which parts of the eyeglasses are made of injection molded plastic material or engineering plastics such as cellulose acetate and other parts are made of metal.

In one aspect, a pair of foldable eyeglasses having multiple set of hinges is disclosed. The foldable eyeglasses include a frame surrounding a pair of lenses, and a pair of temples each of which extend rearward from an outer edge of the frame when the pair of eyeglasses is in an unfolded configuration and the pair of eyeglasses is being worn by a user. The foldable eyeglasses also include a first pair of hinges or first pivot connections positioned on respective temples of the pair of temples for folding the pair of temples horizontally inward from the unfolded configuration toward the frame into a first folded configuration. The foldable eyeglasses additionally include a second pair of hinges or second pivot connections for folding the pair of temples vertically downward from the first folded configuration toward the frame into a second, fully folded configuration.

In some embodiments, the second pivot connections are positioned adjacent to the respective outer edges of the frame and between the respective first pivot connection and the outer edge of the frame.

In some embodiments, the second hinges or pivot connections are configured to rotate around an axis which is substantially parallel to or aligned with the plane of the frame and substantially perpendicular to the respective outer edge of the frame.

In some embodiments, each temple includes a first portion located between the first and second pivot connections and a second portion extended beyond the first pivot connection. The first portion is affixed to a rotating part of the second pivot connection and is substantially perpendicular to the axis of the second pivot connection.

In some embodiments, after folding the temples using the first pivot connections or hinges into the first folded configuration, the second portion of the temple is substantially parallel to the plane of the frame while the first portion of the temple remains unfolded.

In some embodiments, the first portion of the temple is configured with a length which is substantially equal to or greater than a distance between the axis of the second pivot connection and a bottom edge of the frame.

In some embodiments, folding the temples vertically from the first folded configuration toward the frame into the second folded configuration using the second pivot connections includes rotating the first portion of the temple around the axis of the respective second pivot connection by approximately 90 degrees.

In some embodiments, after folding the temples vertically using the second pair of hinges or pivot connections into the second folded configuration, the first portion of the temple is substantially parallel to the plane of the frame while it remains perpendicular to the axis of the respective second hinge or pivot connection.

In some embodiments, each second pivot connection includes a tension spring which is configured to keep the first portion of the temple in an unfolded configuration even when the second portion of the temple is folded into the first folded configuration.

In some embodiments, the tension spring is configured to unfold the second portion of the temple from the second folded configuration to the unfolded configuration when a tension is removed from the tension spring.

In some embodiments, each second hinge or pivot connection forms at least a part of an end piece of the eyeglasses which connects the outer edge of the frame to the temple of the eyeglasses. In other embodiments, each second hinge or pivot connection is at least partially mounted within an enlarged mounting portion in the respective side edge of the eyeglass frame.

In some embodiments, the foldable eyeglasses is operable to be placed inside a collapsible case which operates to fold the foldable eyeglasses from the first folded configuration into the second folded configuration by closing a lid of the collapsible case onto the partially folded temples of the foldable eyeglasses.

In another aspect, an end piece of a pair of foldable eyeglasses for connecting an outer edge of a rim of the eyeglasses to a temple of the eyeglasses is disclosed. This end piece includes a stationary part which is affixed to the outer edge of the rim of the eyeglasses. The end piece also includes a rotatory part which is affixed to the temple of the eyeglasses and attached to the stationary part horizontally through an attachment mechanism. The rotary part also includes a tension spring which inclines to keep the temple of the eyeglasses in an unfolded configuration when the eyeglasses are being worn by a user. Together, the stationary part and the rotary part of the end piece form a rolling hinge which is operable to fold the temple from the unfolded configuration vertically downward into a folded configuration such that the temple is substantially in the same plane as the rim of the eyeglasses.

In some embodiments, the stationary part further includes an attachment part for connecting the stationary part with the outer edge of the rim and a fastening part attached to the attachment part and containing a threaded borehole. The stationary part additionally includes a first cylindrical tube attached to the attachment part such that the fastening part is substantially inside and coaxial with the first cylindrical tube.

In some embodiments, the rotary part further includes a second cylindrical tube attached to the temple of the eyeglasses at an outer surface of the second cylindrical tube. The tension spring of the rotary part is substantially positioned inside the second cylindrical tube and in contact with the inner surface of the second cylindrical tube. This configuration causes the tension spring to rotate along with the second cylindrical tube. Moreover, the second cylindrical tube is substantially coaxial with the first cylindrical tube in the stationary part. In some embodiments, the tension spring includes an extended end which is securely attached to the stationary part of the rolling hinge. In some embodiments, the tension spring is attached to the stationary part of the rolling hinge by being fitted inside a groove cut into the surface of the fastening part of the stationary part.

In some embodiments, the second cylindrical tube has a diameter which is smaller than the diameter of the first cylindrical tube and greater than the diameter of the fastening part, wherein the second cylindrical tube is partially inserted into a gap between the first cylindrical tube and the fastening part.

In some embodiments, the rolling hinge is operable to fold the temple from the unfolded configuration vertically downward into the folded configuration by rotating the rotary part around the stationary part by approximately 90 degrees.

In some embodiments, the rim includes a rim lock. In some embodiments, the rim does not include a rim lock.

In a further aspect, a foldable eyeglasses and collapsible case assembly comprises: a pair of eyeglasses comprising a frame surrounding a pair of lenses and temples extending from an outer edge of the frame; a horizontal hinge or first pivot connection positioned on each temple for folding the temples horizontally toward the frame into a first collapsible position; a vertical hinge or second pivot connection positioned on each temple for folding the temples vertically toward the frame into a second collapsible position; and a collapsible case which operates to fold the eyeglasses from the first collapsible position into the second collapsible position by closing a lid of the case onto the temples.

In one aspect, the frame, both portions of temples of the eyeglasses, the end piece and hinges are of metal. In another aspect, the entire frame and outer tip portions of the temples are of a suitable injection molded plastic material such as acetate or cellulose acetate, while the temples and the end pieces are of metal.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 3A illustrates a left side view schematic of eyeglasses in an unfolded configuration in accordance with one embodiment.

FIG. 3B illustrates a top plan view of the eyeglasses of FIG. 3A in an unfolded configuration in accordance with one embodiment.

FIG. 3C illustrates a front elevation view of the eyeglasses of FIG. 3A and FIG. 3B in an unfolded condition in accordance with one embodiment.

FIG. 3D illustrates right side elevation view schematic of the eyeglasses of FIGS. 3A to 3C in the unfolded configuration.

FIG. 5 illustrates another embodiment of the mechanical structure of the end piece of a pair of proposed eyeglasses which includes a rolling hinge as part of the end piece in accordance with an embodiment.

DETAILED DESCRIPTION

Figure 1A:
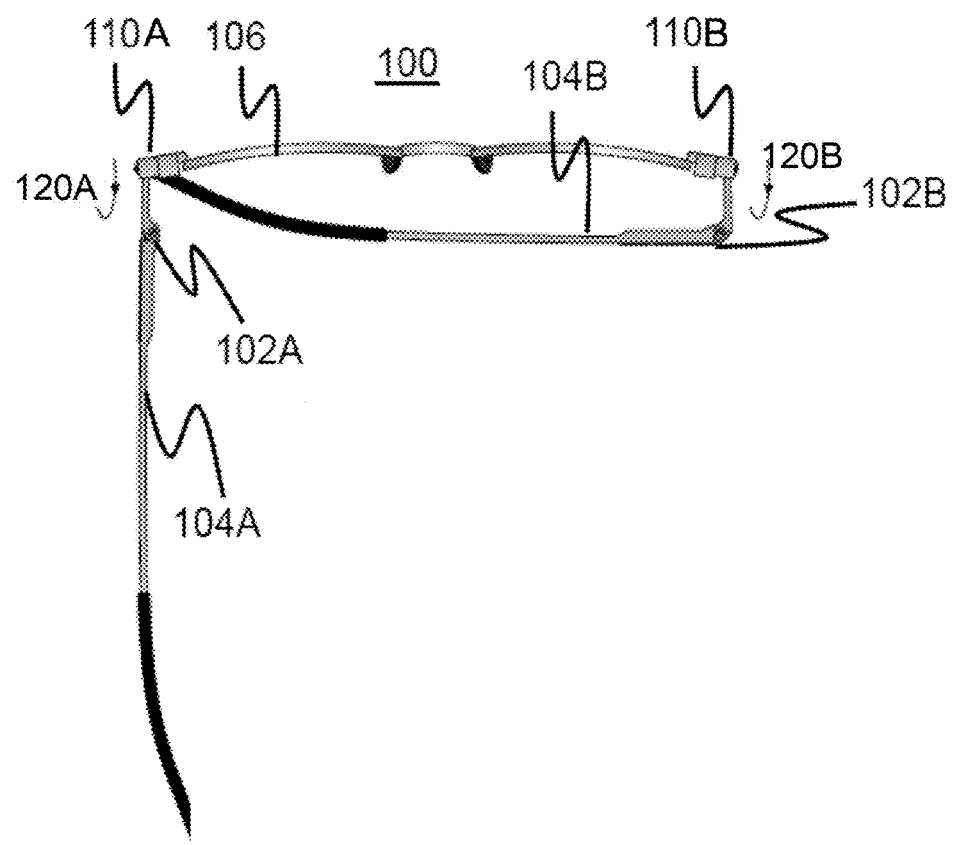
FIG. 1A shows a top-plan view of a pair of foldable eyeglasses with one of the temples folded along a first hinge into a first folded configuration, in accordance with one embodiment.

Some embodiments disclosed herein provide for foldable eyeglasses with multiple sets of hinges for folding the eyeglasses into a compact configuration to be fitted inside a compact case for easy storage and carrying. In one aspect, the multiple sets of hinges include a first pair of hinges (or "horizontal" hinges) located within the temples and near the frame of the eyeglasses which folds first on outer portions of the temples of the eyeglasses inward in a conventional folding manner. The multiple sets of hinges also include a second pair of "rolling" hinges (or "vertical" hinges) located immediately adjacent to or partially within the rim or frame of the eyeglasses which folds the temples of the eyeglasses downward toward the plane of the rim/frame and lenses. When both pairs of the hinges are engaged, the foldable eyeglasses are collapsed into a compact configuration which has a very thin profile to be fitted into an ultra-thin case.

In another aspect, the first pair of hinges may be engaged first to fold the temples of the eyeglasses into a conventional folded configuration, which is also referred to as a "first folded configuration," or a "partially folded configuration." Next, the partially folded eyeglasses are placed inside a case with the frame and lenses facing downward while the second pair of hinges remains unengaged. Next, the lid of the case is closed over the eyeglasses, which pushes on the temples of the eyeglasses. The applied pressure causes the second pair of hinges to engage so that the temples of the eyeglasses rotate and fold around the second pair of hinges into a fully folded configuration (also referred to as a "second folded configuration") to allow the case to close and be latched with the eyeglasses securely stored inside the case.

In a further aspect, an end piece or pivot connection device is provided on or partially within outer edges or sides of the frame pivotally connecting the outer edge of the rim or frame of the eyeglasses to a temple of the eyeglasses. Each end piece or pivot connection includes a stationary part which is affixed to the outer edge of the frame of the eyeglasses or embedded in a receiving recess or indent in the outer edge of the frame. The end piece also includes a rotating part which is affixed to the temple of the eyeglasses and rotatably attached to the stationary part. The pivot connection also includes a tension spring between the fixed and rotatable parts to keep the temple of the eyeglasses in an unfolded configuration when the eyeglasses are being worn by a user. The stationary part and the rotating part of the end piece form a rolling hinge which is operable to fold the temple from the unfolded configuration vertically downward into a folded configuration such that the temple is substantially in the same plane as the rim of the eyeglasses.

In some embodiments, the stationary part further includes an attachment part for connecting the stationary part with the outer edge of the rim and a fastening part attached to the attachment part and containing a threaded borehole. The stationary part additionally includes a cylindrical tube attached to the attachment part such that the fastening part is substantially inside and coaxial with the first cylindrical tube. The rotatory part further includes another cylindrical tube attached to the temple of the eyeglasses at an outer surface of the second cylindrical tube. The tension spring is substantially positioned inside the second cylindrical tube and in contact with the inner surface of the second cylindrical tube. This configuration causes the tension spring to rotate along with the second cylindrical tube. In some embodiments, the tension spring includes an extended end which is securely attached to the stationary part of the rolling hinge. Moreover, the second cylindrical tube is substantially coaxial with the first cylindrical tube in the stationary part.

In a second embodiment, each hinge connection is at least partially housed in an indent in a respective outer side portion of the frame. In this embodiment, the eyeglass frame may be of engineering plastic or the like while the pivot connection is of metal. A stationary tubular part may be housed in the indent and has a pivot pin on which a sleeve attached to a respective temple is rotatably mounted.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1B:
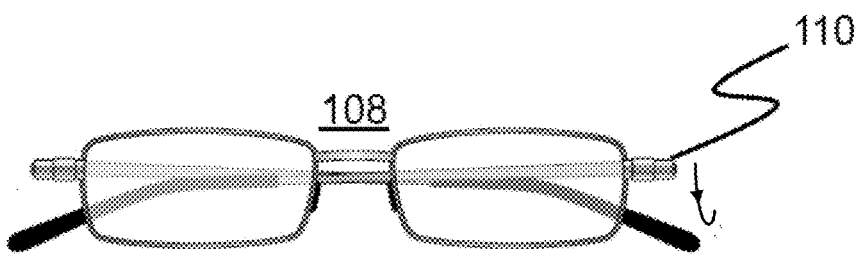
FIG. 1B shows a front view of a first folded configuration of the proposed eyeglasses when both of the temples are properly folded at the corresponding first hinges in accordance with one embodiment.

FIG. 1A shows a top-down view of one embodiment of a pair of dual-hinged foldable eyeglasses with temples being folded along a first set of hinges into a first folded configuration, in accordance with one embodiment of the invention. As illustrated in FIG. 1, the eyeglasses 100 include a first set of hinges or pivot connections 102 including a pair of hinges 102A and 102B located a short distance from the rim or frame 106 of the eyeglasses. Hinges 102 are configured to collapse the temples 104A and 104B of eyeglasses 100 horizontally into the frame 106 to form a first folded configuration of eyeglasses 100, which is similar to a pair of folded conventional eyeglasses. FIG. 1A illustrates eyeglasses 100 in a partially folded configuration where a left hinge 102A of the first set of hinges 102 are in an unfolded configuration on a left temple 104A and a right hinge 102B is in a folded configuration on the right temple 104B. FIG. 1B shows a front view of the first folded configuration 108 of eyeglasses 100 when both of the temples 104A and 104B are properly folded into a first folding configuration at the corresponding hinges 102A and 102B in accordance with one embodiment of the invention. Eyeglasses 100 can include various types of vision-correction eyeglasses, sunglasses, among others.

As show in FIG. 1A, eyeglasses 100 also include a second set of hinges or pivot connections 110 including a pair of hinges 110A and 110B located substantially adjacent to the frame 106 of eyeglasses 100. In some embodiments, the second set of hinges 110 are part of the end pieces of eyeglasses 100. Embodiments of mechanism structure of hinges 110 are described below in conjunction with FIGS. 4 and 5. In the embodiment shown, hinges 110 are configured to rotate according to the directional arrows 120A and 120B to fold the temples 104A and 104B vertically downward from the first folded configuration 108 shown in FIG. 1A and FIG. 1B into a position below the frame 106 to form a second folded configuration.

Figure 2A:
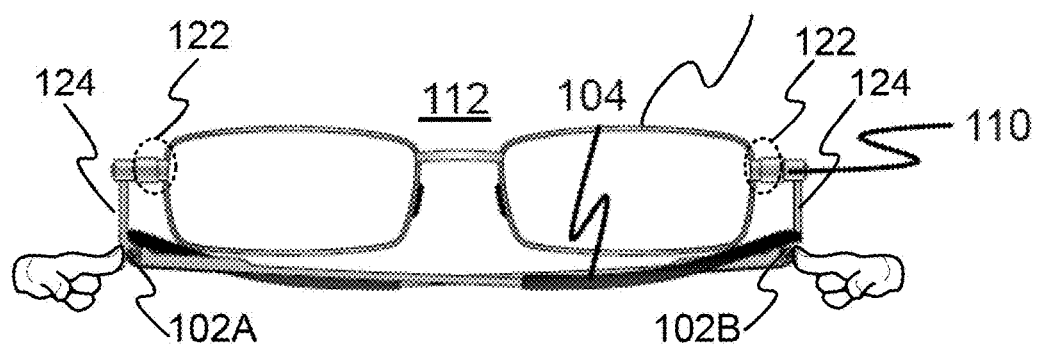
FIG. 2A shows the eyeglasses of FIG. 1A and FIG. 1B being collapsed into a second folded configuration using a second set of hinges in accordance with one embodiment.

FIG. 2A shows eyeglasses 100 being collapsed into the second folded configuration 112 using the second set of hinges 110 in accordance with one embodiment of the invention. As can be seen in FIG. 2A, the second set of hinges 110 is positioned immediately adjacent to the frame 106 and in substantially the same plane as the frame 106 so that the temples 104 can fold downward to a position immediately below the frame 106 and in substantially the same plane as frame 106, creating an ultra-thin profile for set of folded eyeglasses with a minimal thickness.

The second pivot connection include a pair of end pieces 122 attached to frame 106 for connecting temples 104 to frame 106. In some embodiments, the rotatable parts of hinges 110 may have cylindrical shapes to facilitate "rolling" or rotational motions. Accordingly, the end pieces 122 may include a cylindrical part to accommodate the cylindrical-shaped rotating parts as described in more detail below. More specifically, the rotating part of each pivot connection may be inserted into the cylindrical part of the respective end piece 122. When put together, the second pivot connections of eyeglasses 100 are substantially in the same plane as frame 106. More detailed embodiments of the second pivot connections or hinges 110 are described below in conjunction with FIGS. 4 and 5.

As can be seen in FIG. 2A, between the first set of hinges 102 and the second set of hinges 110 is a pair of straight temple sections 124. When eyeglasses 100 are unfolded at the first set of hinges 102, straight sections 124 are part of the temples 104, as shown in FIG. 1A. When eyeglasses 100 are folded by the first set of hinges 102, straight sections 124 create a predetermined space which keeps the folded temples 104 some distance away from the frame 106. Hence, when eyeglasses 100 are folded into the second folded configuration 112, as shown in FIG. 2A, the bottom of the frame 106 is positioned inside the space created by the straight sections 124 and the folded temples 104, without interfering with the temples 104. This configuration allows for a flat profile with a minimum thickness.

Figure 2B:
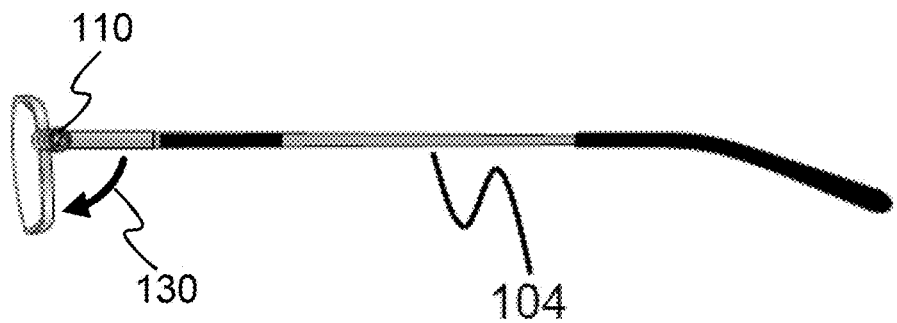
FIG. 2B shows a side view of the eyeglasses of FIGS. 1A to 2A where the hinges are in an unfolded configuration in accordance with one embodiment.
Figure 2C:
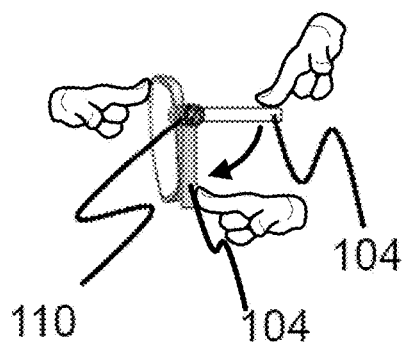
FIG. 2C shows a side view of the eyeglasses similar to FIG. 2B where the temples are rotated from the first folded configuration of FIG. 1B into the second folded configuration of FIG. 2A in accordance with one embodiment.

FIG. 2B shows a side view of eyeglasses 100 where the second set of hinges 110 is in an unfolded configuration in accordance with one embodiment of the invention. In this embodiment, at least one of the first set of hinges 102 is also shown in the unfolded configuration. Also shown in FIG. 2B is the direction of rotation of the second set of hinges 110 by an arrow 130. FIG. 2C shows a side view of eyeglasses 100 where the temples 104 are rotated from the first folded configuration 108 into the second folded configuration 112 in accordance with one embodiment of the invention. In this embodiment, eyeglasses 100 are in the first folded configuration 108 prior to the folding movement. FIG. 2C also illustrates the motion of the temples 104 from the first folded configuration 108 to the second folded configuration 112 as the temples 104 pivot around the second set of hinges 110. As discussed above, FIG. 2A illustrates a front-view of the eyeglasses 100 in the second folded configuration 112 where the temples 104 have been folded down and approximately below the frames 106. In some embodiments, the second set of hinges may be rolling hinges made of cylindrical parts which provide a simple rolling motion of the temples without creating any separated or sharp edges between the separated parts.

FIGS. 3A-3D illustrate multiple viewing-angle schematics of a more detailed design of the proposed eyeglasses having two sets of hinges in accordance with one embodiment of the invention. More specifically, FIG. 3A illustrates a left side view schematic of the exemplary eyeglasses in an unfolded configuration in accordance with one embodiment of the invention. More specifically, FIG. 3A shows a set of design parameters of the temples of the exemplary eyeglasses. FIG. 3B illustrates a top plan view of the exemplary eyeglasses in an unfolded configuration in accordance with one embodiment of the invention. More specifically, FIG. 3B shows various design parameters of the temples, the two pairs of hinges, and the bridge of the exemplary eyeglasses. Notably, the location of the second set of hinges 310 is immediately adjacent the rim of the lenses, so that the hinges 310 become part of the end pieces of the eyeglasses. FIG. 3C illustrates a front elevation view of the exemplary eyeglasses in accordance with one embodiment of the invention. More specifically, FIG. 3C shows various design parameters of the frame of the exemplary eyeglasses. FIG. 3D illustrates a right side elevation view of the exemplary eyeglasses in the unfolded configuration in accordance with one embodiment of the invention. More specifically, FIG. 3D shows additional design parameters of the temples of the exemplary eyeglasses.

In some embodiments such as the embodiment illustrated in FIGS. 3B and 3C, the second set of hinges 310 are shown to include a rolling hinge and a tension spring, so that the hinges 310 are inclined to remain in an unfolded configuration. To place the hinges 310 into the second folded configuration, one applies force to the hinges via downward pressure on the temples of the eyeglasses (as discussed above in conjunction with FIGS. 2B and 2C). In this manner, the eyeglasses are configured to function in conjunction with a collapsible case (described below) such that a lid of the case can be collapsed down onto the temples of the eyeglasses in the first folded configuration to force the second set of hinges to fold the temples into the second folded configuration as the case is closed. This results in a closed case with a minimal thickness, as shown and illustrated below.

An additional benefit of the spring-loaded second set of hinges is that the eyeglasses are more comfortable and easier to wear for the user because the springs ensure that the temples remain in the unfolded configuration when being worn. Without these tension springs, the frame or temples may rotate while the user is wearing the eyeglasses, resulting in unwanted movement of the eyeglasses when being worn. In some embodiments, the springs in the hinges are configured to only allow the hinges to rotate approximately 90 degrees (e.g., a few degrees more or less than 90 degrees) so that when in the second folded configuration, the temples are positioned immediately below or at the bottom of the frame. This design results in an ideal folded position with the smallest potential thickness of the eyeglasses, while providing the benefit of not allowing the temples to over-rotate past the plane of the frame into a position forward of the lenses and frame. Additional rotation may cause the eyeglasses to rotate into an unsafe or unstable position that may cause the temples or hinges to break, or may cause damage to the lenses by having the lenses in contact with the temples.

Figure 4:
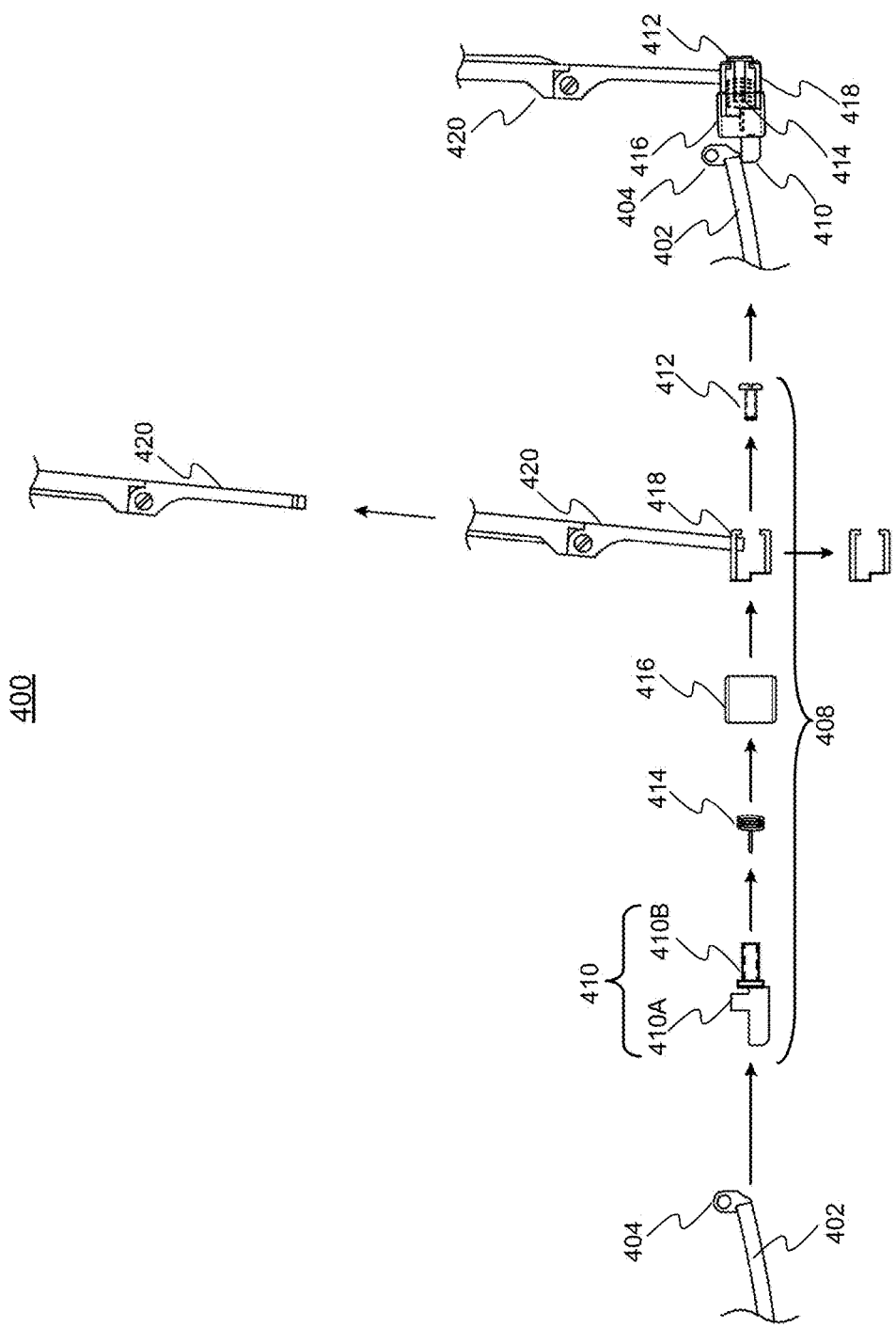
FIG. 4 illustrates one embodiment of the mechanical structure of the end piece of a pair of eyeglasses which includes a rolling hinge as part of the end piece in accordance with one embodiment.

FIG. 4 illustrates an exemplary mechanical structure of the second hinges or pivot connection of a pair of proposed eyeglasses 400 which includes a rolling hinge as part of the end piece in accordance with one embodiment of the invention. As illustrated in FIG. 4, the rim 402 of the eyeglasses 400 includes a rim lock 404 for securely locking rim 402 around a lens (not shown). Also shown in FIG. 4 is an end piece or pivot connection 408 which comprises a set of subcomponents, including a rolling hinge, which is an embodiment of the proposed second set of hinges. More specifically, end piece 408 includes a part 410 for attaching end piece 408 to rim 402. Part 410 further includes an attachment part 410A that has a flat notch for connecting the end piece 408 with the front side of the rim 402. Part 410 also includes a cylindrical part 410B containing a threaded borehole for receiving a screw 412 (described later). End piece 408 includes a tension spring 414 as part of the rolling hinge. As can be seen in FIG. 4, tension spring 414 has a slightly larger diameter than the diameter of the cylindrical part 410B so that the spring can be snugly fitted onto cylindrical part 410B. End piece 408 also includes a cylindrical tube 416 of a greater diameter than the tension spring 414. Cylindrical tube 416 can be jointed with part 410, such as through the attachment part 410A, to form the stationary part of the rolling hinge.

End piece 408 additionally includes a rolling tube 418 which is also part of the rolling hinge. As can be seen in FIG. 4, rolling tube 418 is also attached to the end of temple 420 of the eyeglasses. As such, rolling tube 418 provides a rotatable attachment mechanism between temple 420 and end piece 408 so that the rolling hinge can be rotated by applying pressure on temple 420. When the end piece 408 is assembled, tension spring 414 is contained by rolling tube 418, which itself can partially slide into cylindrical tube 416. The entire structure is held together by screw 412 which goes inside cylindrical part 410B. More specifically, the threaded part of screw 412 passes through both tension spring 414 and rolling tube 418 before entering the borehole of cylindrical part 410B. The right opening of the rolling tube 418 is configured slightly larger than the diameter of the threaded part of screw 412 but smaller than the head of screw 412. Hence, after tightening, the head of screw 412 is stopped by the entrance of the rolling tube 418.

Rolling tube 418 and tension spring 414, which is largely positioned inside rolling tube 418, form the rotatory part of the rolling hinge. More specifically, when assembled, the rotatory part of the rolling hinge comprising rolling tube 418 and tension spring 414 is physically confined by the stationary part of the rolling hinge comprising cylindrical part 410B, screw 412 and cylindrical tube 416 so that the rotatory part is allowed to rotate around the axis of the assembly but not able to displace horizontally. The tension inside the rolling hinge can be created by securely attaching one end of tension spring 414 (e.g., using the extended end of the spring 414 shown in FIG. 4) to the stationary part of the rolling hinge while allowing the rest of the tension spring 414 to rotate along with the rolling rube 418. In some embodiments, the tension spring is attached to the stationary part of the rolling hinge by being fitted inside a grove which is cut into the surface of the cylindrical part 410B of the stationary part. To create the situation where the temple 420 of the eyeglasses remains in the unfolded configuration when being worn, tension spring 414 is configured in a relaxed state when the temple 420 is fully unfolded as shown in FIG. 4. Note that the exemplary design of eyeglasses 400 provides one embodiment of the second set of hinges, but many other variations of end piece 408 are possible to form a rolling hinge to create the proposed second set of hinges.

FIG. 5 illustrates another exemplary mechanical structure of the end piece of a pair of proposed eyeglasses 500 which includes a rolling hinge as part of the end piece in accordance with one embodiment of the invention. One main difference between eyeglasses 400 and eyeglasses 500 is that eyeglasses 500 do not include a rim lock. Examples of such eyeglasses include rimless eyeglasses. One noticeable difference in eyeglasses 500 is that attachment part 510A has different notch configuration than attachment part 410A in eyeglasses 400 for attaching end piece 508 to the rimless lens 502.

Figure 6A:
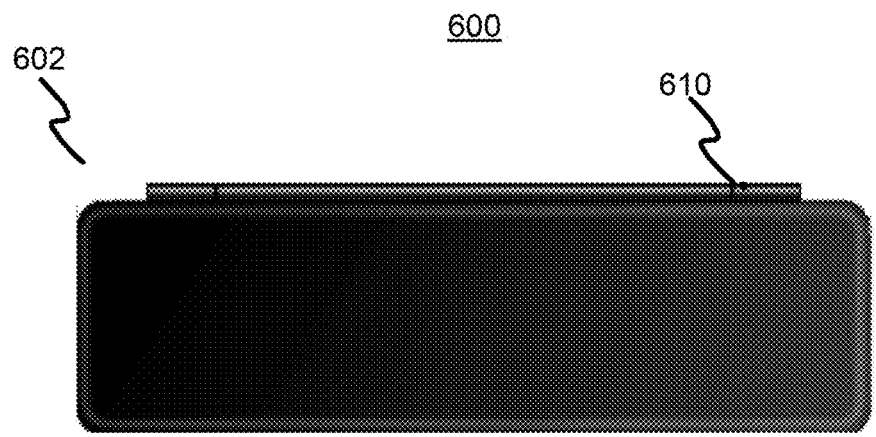
FIG. 6A illustrates a top plan view of one embodiment a foldable eyeglasses case in a closed configuration to be used with any of the eyeglasses of FIGS. 1 to 5.
Figure 6B:
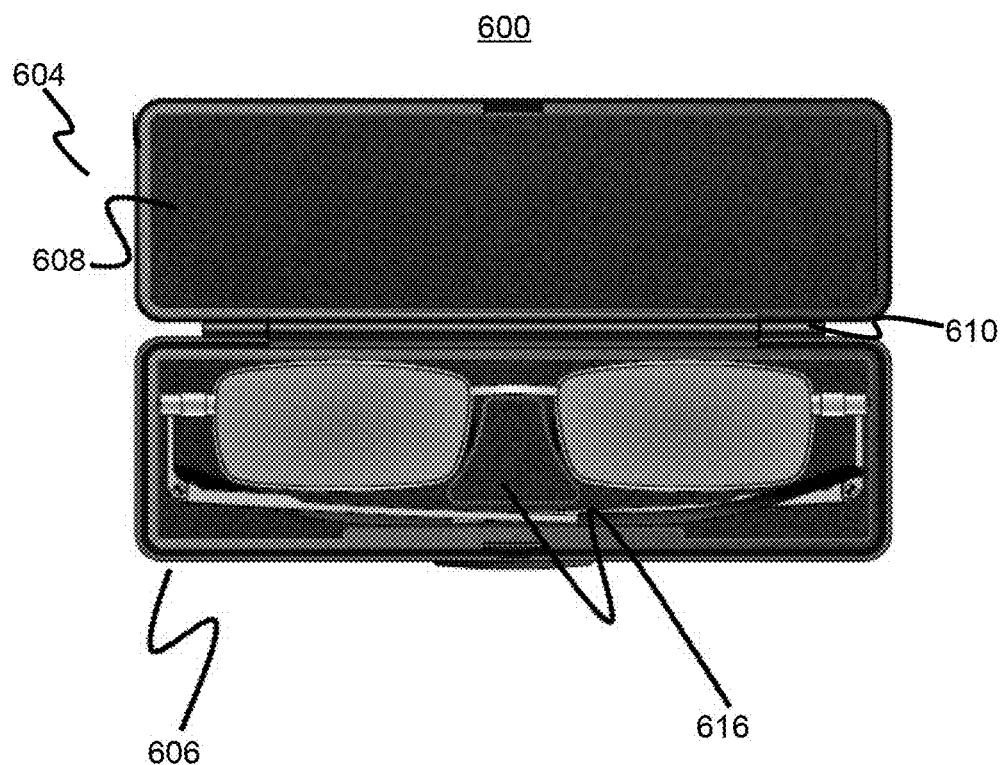
FIG. 6B illustrates a top plan view of the ultra-compact collapsible case of FIG. 6A in an open configuration.
Figure 6C:
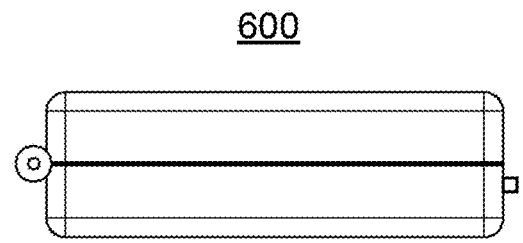
FIG. 6C illustrates a side elevation view of the ultra-compact collapsible case of FIG. 6A and FIG. 6B in the closed configuration.

In some embodiments, the dual-hinged foldable eyeglasses of the above embodiments operate to fold into the compact, second folded configuration with an ultra-thin profile which can be fitted inside an ultra-compact collapsible case. FIG. 6A illustrates a top plan view of such an ultra-compact collapsible case 600 in a closed configuration 602 in accordance with one embodiment of the invention, while FIG. 6B illustrates a top plan view of this ultra-compact collapsible case 600 in an open configuration 604 in accordance with one embodiment of the invention. As can be seen in FIG. 6B, the ultra-compact case includes a bottom portion 606 which holds the eyeglasses and a top cover 608 connected with the bottom portion 606 via a hinge 610. FIG. 6B also illustrates how the proposed eyeglasses fit into the bottom portion 606 in the above described second folded configuration. FIG. 6C illustrates a side view of the ultra-compact collapsible case 600 in the closed configuration in accordance with one embodiment of the invention. It can be seen that case 600 has small dimensions when the eyeglasses are folded within.

Figure 6D:
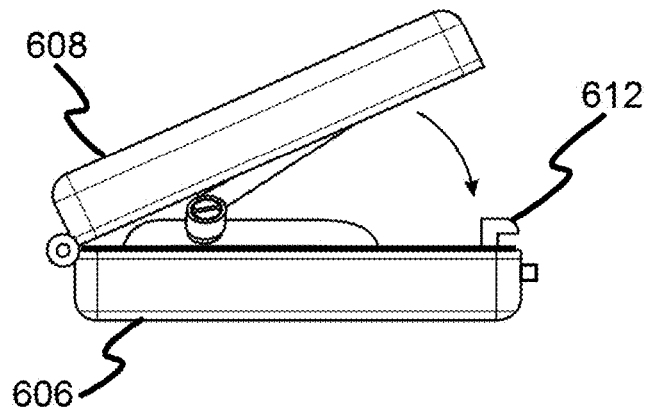
FIG. 6D is a side elevation of the collapsible case of FIGS. 6A to 6C being collapsed from the open configuration towards the closed configuration with the pair of foldable eyeglasses contained therein.

FIG. 6D illustrates a designed function of the ultra-compact collapsible case 600 in conjunction with the proposed foldable eyeglasses. More specifically, FIG. 6D provides a side view illustration of the collapsible case 600 being collapsed from the open configuration 604 to the closed configuration 602 with the pair of foldable eyeglasses contained therein. As can be seen in FIG. 6D, the case is used to fold the temples of the eyeglasses from the first folded configuration into the second folded configuration as the top cover 608 is being closed onto the bottom portion 606. In other words, the top cover 608 operates to rotate the second pair of hinges and fold the temples down into the plane of the lenses. The case 600 can then be secured into the closed configuration via a latch 612, which may be configured with an angled top front edge to help the top cover 608 easily slide forward and down over the latch 612 to create a secure closure.

In some embodiments, the dual-hinged eyeglasses can also be placed inside case 600 in the first folded configuration with the top of the frame and the temples of the eyeglasses facing down on the bottom portion 606. In this placement, the bottom of the frame is positioned upward as a result of the tension spring. To close the case, the top cover 608 of case 600 is used to fold the frame of the eyeglasses from the first folded configuration into the second folded configuration as the top cover 608 is being closed onto the bottom portion 606. In other words, the top cover 608 operates to rotate the second pair of hinges and fold the frame down into the plane of the temples.

Figure 6E:
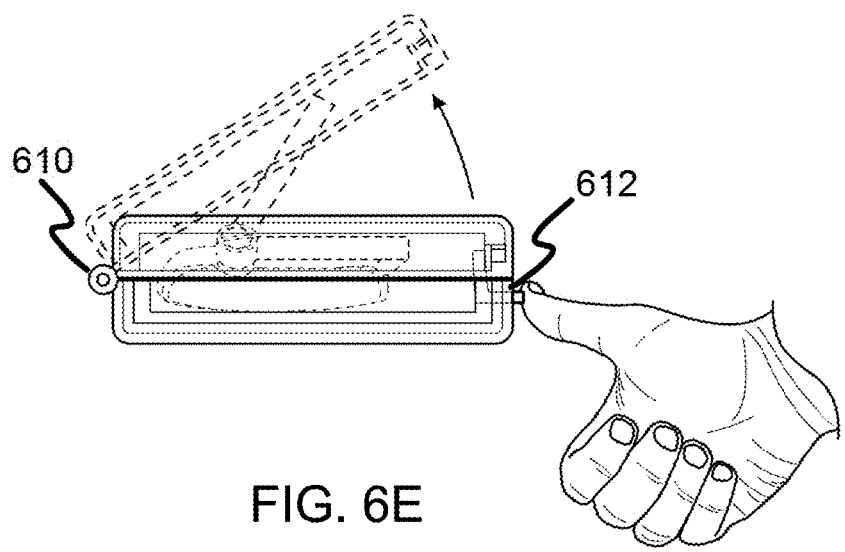
FIG. 6E is a side elevation view illustrating the collapsible case being opened from the closed configuration to the open configuration by actuating the latch.

FIG. 6E illustrates a reverse operation of the one shown in FIG. 6D. More specifically, FIG. 6E provides a side view illustration of the collapsible case 600 being opened from the closed configuration 602 to the open configuration 604 by actuating the latch 612 in accordance with one embodiment of the invention. In some embodiments, the hinge 610 of the collapsible case 600 and the second pair of hinges of the eyeglasses include tension springs, so that when the latch 612 is pressed, the tension springs operate to force the top cover 608 open and expand the temples of the eyeglasses from the second folded configuration to the first folded configuration. In other embodiments, only the second pair of hinges of the eyeglasses include tension springs but not in the hinge 610 of the collapsible case. In these embodiments, when the latch 612 is pressed, the tension springs of the eyeglasses also operate to force the top cover 608 open and expand the temples of the eyeglasses from the second folded configuration to the first folded configuration.

Referring back to FIG. 6B, the embodiment of the case 600 may also include a positioning element 616 which facilitates a user to position the eyeglasses inside the case in a desired position that allows the case to easily close onto the temples of the eyeglasses. The positioning element 616 can be formed as a raised element in the middle of the case which helps the user position the eyeglasses into the case such that the lenses are placed on opposing sides of the positioning element 616. This configuration also forces the user to place the eyeglasses into the case with the lenses and frames facing down, which allows for the top cover 604 of the case to more easily fold the eyeglasses into the second folded configuration by making contact with the temples of the eyeglasses as opposed to contacting the frame of the eyeglasses, which provides better protection for the frame and lenses. This configuration also allows the angle of closure of the top cover of the case to force the temples into their second folded configuration more easily in one direction.

Figure 7A:
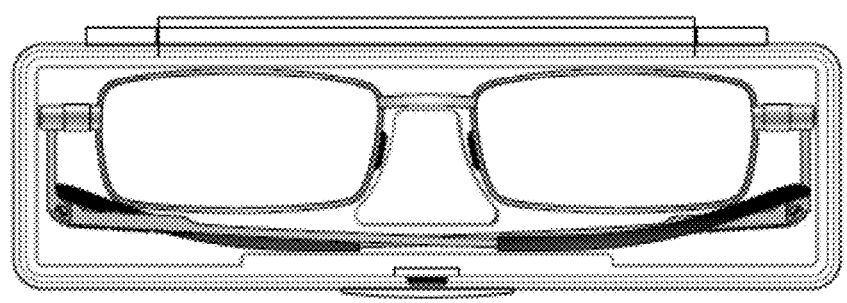
FIG. 7A is a top plan see-through illustration of the ultra-compact collapsible case of FIGS. 6A to 6E in the closed.
Figure 7B:
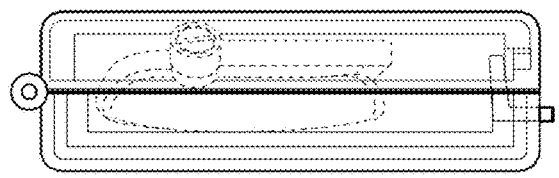
FIG. 7B is a side elevation see-through illustration of the ultra-compact collapsible case of FIGS. 6A to 7A in the closed configuration with the foldable eyeglasses inside.
Figure 7C:
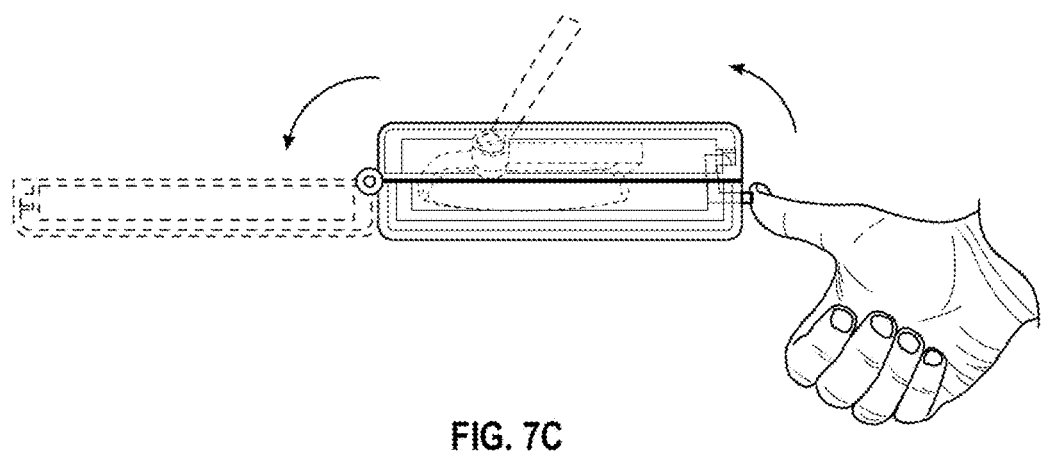
FIG. 7C is a side elevation see-through illustration similar to FIG. 7B showing in dotted outline of how the opening of the case causes the eyeglasses to automatically assume the first folded configuration as a result of the tension springs in the second set of hinges.

FIG. 7A is a top-down see-through illustration of the ultra-compact collapsible case in the closed configuration with the foldable eyeglasses inside in accordance with one embodiment of the invention, while FIG. 7B is a side view see-through illustration of the ultra-compact collapsible case in the closed configuration with the foldable eyeglasses inside in accordance with one embodiment of the invention. Finally, FIG. 7C is a side view see-through illustration of how the opening of the case causes the eyeglasses to automatically assume the first folded configuration as a result of the tension springs in the second set of hinges in accordance with one embodiment of the invention.

As already described above, the collapsible case 600 includes latch 612 to hold the case in a closed position. In some embodiments, latch 612 is designed with a curved top surface and a clasp immediately underneath the curved top surface. This provides for a simple and smooth closing of the lid as the lid is being forced down onto the temples.

In some embodiments, hinge 610 on the collapsible case is a tension hinge, such as a piano hinge, which is provided to operate in conjunction with the spring tension in the rolling hinge of the second set of hinges on the glasses in order to allow the case to open and close with the expansion and contraction of the second set of hinges.

Figure 8:
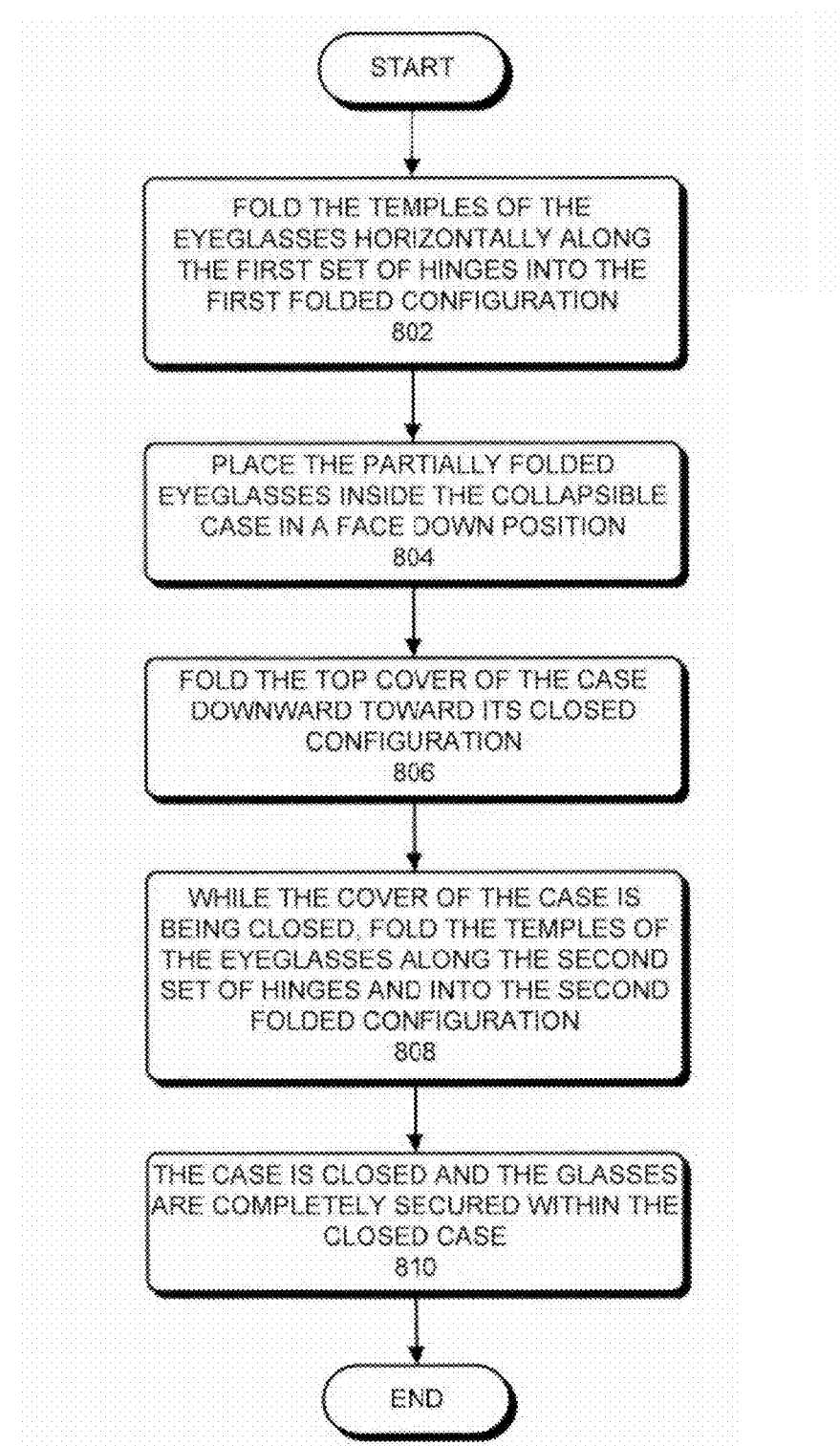
FIG. 8 provides a flowchart illustrating a process of folding the folded eyeglasses into the collapsible case as in FIGS. 6A to 7C for compact storage and easy carrying in accordance with one embodiment of the invention.

FIG. 8 provides a flowchart illustrating a process of folding the collapsible eyeglasses into the collapsible case for compact storage and easy carrying in accordance with one embodiment of the invention. During operation, the temples of the eyeglasses are folded horizontally along the first set of hinges into the first folded configuration (step 802). Next, the partially folded eyeglasses are placed inside the collapsible case in a face down position, such that the lenses and the frame are on the bottom of the case (step 804). Next, the top cover of the case is folded downward toward its closed configuration (step 806). While the cover of the case is being closed, the temples of the eyeglasses are folded along the second set of hinges and into the second folded configuration (step 808). Finally, the case is closed, for example, when the latch of the case is engaged and the glasses are completely secured within the closed case (step 810).

FIGS. 9 to 17 illustrate another embodiment of a pair of foldable eyeglasses 700 which are similar to the eyeglasses of FIGS. 1 to 5 and fold about two sets of hinges into a flattened condition to fit into a compact case similar or identical to the case 600 of FIGS. 6A to 7C, and like reference numerals are used for like parts as appropriate. Foldable or fold-flat eyeglasses 700 have a frame 712 with eye wires or rims 713 surrounding openings which receive lenses 714 and a bridge 715 to extend over a wearer's nose, and a pair of temples 716A and 716B which each have a first portion 124 and a second portion 720 pivotally connected to the first portion via a first hinge or pivot connection 102A, 102B identical to the first hinges of the previous embodiments. The temples are connected via a second set of hinges or second pivot connections 710A, 710B to the respective opposite sides of frame 712. The second set of hinges 710A, 710B have aligned pivot axes 719 which extend perpendicular to the respective first temple portions 124 which extend from hinge 710A, 710B to the respective hinge 102A, 102B. Second portions 720 of the temples extend outwards from the respective second hinges to temple tips 722 for engagement over a wearer's ears. Hinges 102A, 102B are located between the respective first and second portions 124, 720 of the temples and have respective pivot axes 725 which are perpendicular to the temples and to pivot axes 719.

Unlike the previous embodiment where the eyeglass temples, hinges, and frame are all of the same material, such as metal or the like, in this embodiment the entire frame 712 is formed from injection molded plastic such as acetate or cellulose acetate. The temples and hinges are formed of metal, as in the previous embodiment, apart from temple tips or sleeves 722 engaged over the outer ends of the second portions 720 of the temples which are formed from the same injection molded plastic material as the frame 712. This results in a strong but lightweight structure. Enlarged end portions 726 on the outer side edges of the frame are configured to house parts of the second set of hinges 710A, 710B, as described in more detail below with reference to FIG. 17. The second pivot connections of this embodiment are therefore more compact and less bulky in appearance than in the previous embodiments where the entire second hinge structure is external to the frame.

Figure 9:
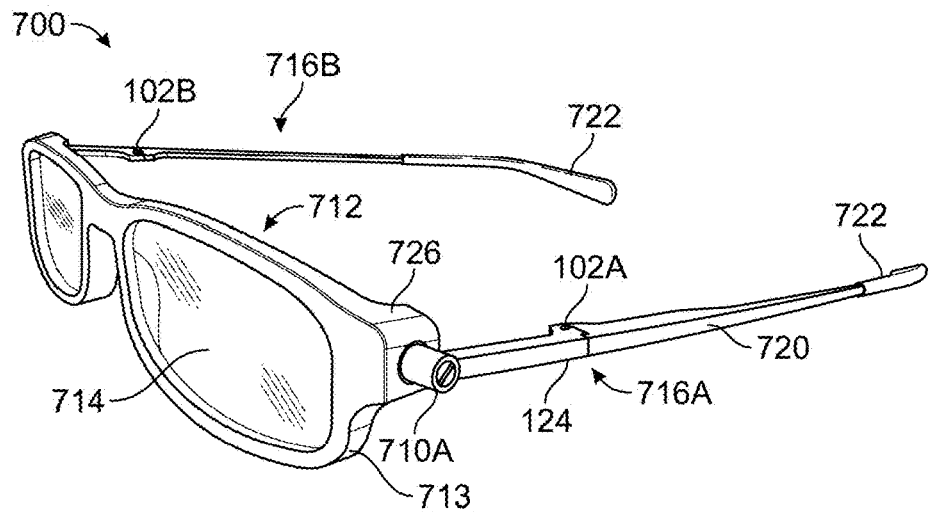
FIG. 9 illustrates a left side perspective view of another embodiment of a pair of foldable eyeglasses in a completely unfolded condition, in which parts of the eyeglasses are made of plastic material and other parts are made of metal.
Figure 10:
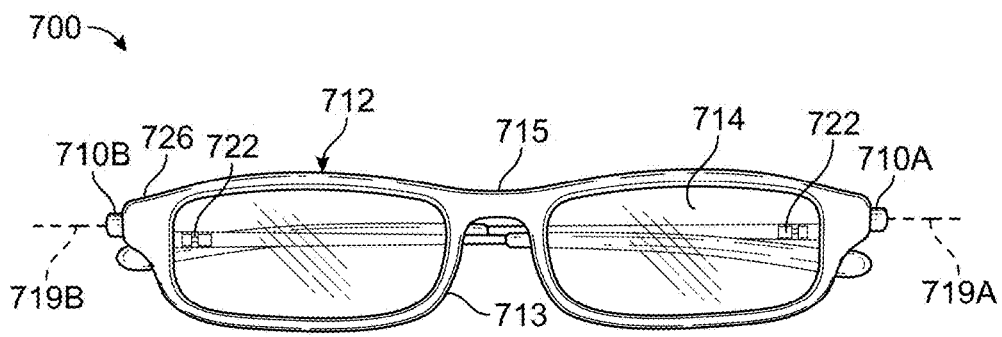
FIG. 10 is a front elevation view of the eyeglasses of FIG. 9 in a first folded configuration in which parts of the temples are folded about a first set of hinges located along the length of the temples.
Figure 12:
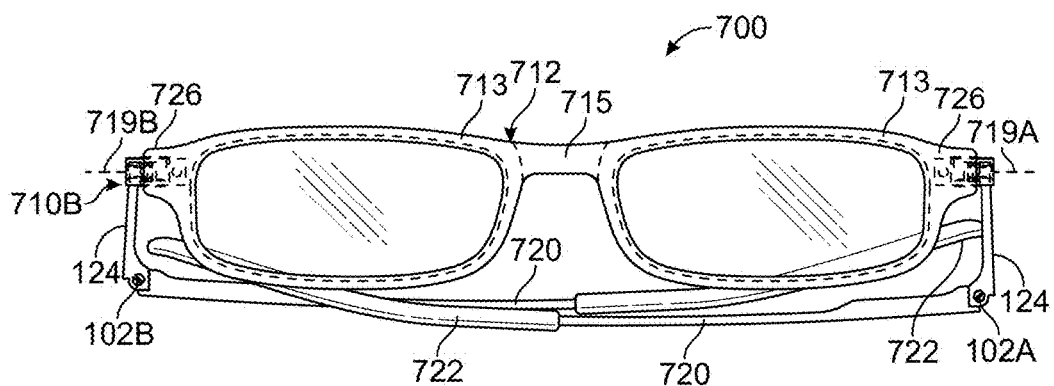
FIG. 12 is a front elevation view of the eyeglasses of FIGS. 9 to 11 in a fully folded, flattened condition.
Figure 13:
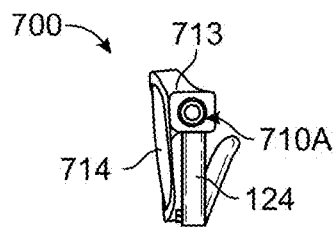
FIG. 13 is a side elevation view of the eyeglasses in the fully folded condition of FIG. 12.
Figure 16:
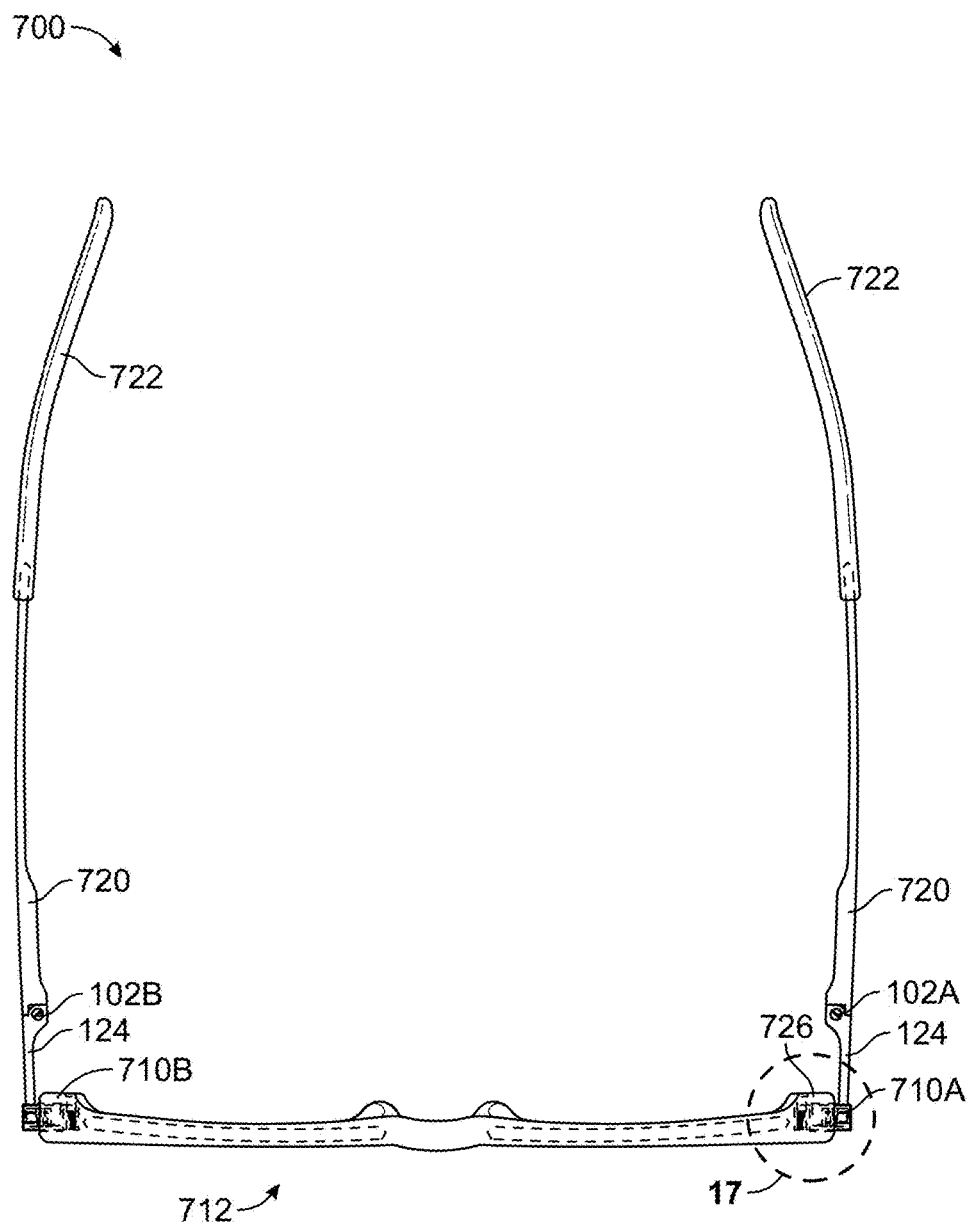
FIG. 16 is a top plan view of the eyeglasses of FIGS. 9 to 15 in the completely unfolded condition of FIGS. 9 and 14.

FIGS. 9, 13 and 16 illustrate the eyeglasses in a fully open condition ready for wear by a user. The second portions 720 of the respective temples are rotatable about the hinges 102A, 102B between the fully extended position of FIGS. 9, 13 and 16 in which they are aligned with the respective first portions 124 of the temples, and the inwardly rotated position of FIGS. 10 and 11 in which they extend inwards from the hinges and overlap with one another at a location spaced inward or rearward from the frame 712. The first portions 124 can then be rotated down about hinges 710A, 710B through around 90 degrees, in exactly the same way as described above in connection with the previous embodiments, until the temples are located beneath and substantially coplanar with the eyeglass frame, as illustrated in FIGS. 12 and 13. In this substantially flat condition, eyeglasses 700 can be placed into a thin, compact storage case, such as the storage case 600 as described above in connection with the previous embodiment. Alternatively, eyeglasses 700 in the partially folded condition of FIGS. 10 and 11 may be placed face downwards in the open base of the storage case, and the lid may be closed as indicated in FIG. 6D, simultaneously rotating the first portions 124 about hinges 710A, 710B into a fully folded condition within the case 600.

Figure 14:
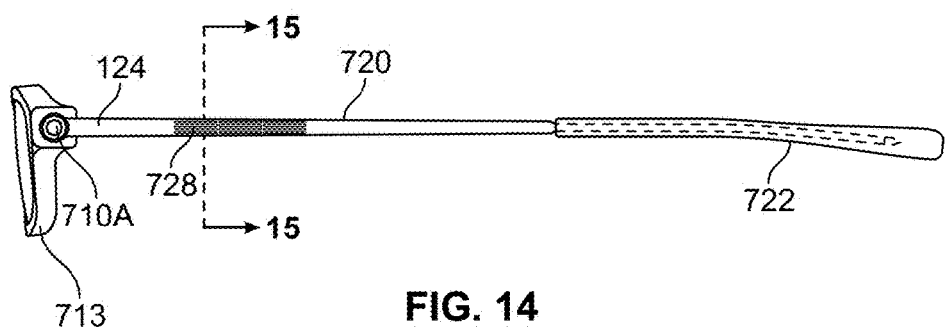
FIG. 14 is a side elevation view of the eyeglasses of FIGS. 9 to 13 in the completely unfolded condition, ready to be worn by a user.
Figure 15:
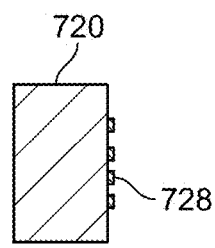
FIG. 15 is a cross section through a ridged part of the left temple of the eyeglasses on the lines 15-15 of FIG. 14, the right temple having identical ridges.

As best illustrated in FIGS. 14 and 15, the second portion 720 of each eyeglass temple has three sets of linear ribs or ridges 728 on its outer surface, with the first set located at a short distance from the hinge connection between the first and second portions of the temples. This provides a decorative effect and also increases the strength of the temple at this folding location.

Figure 17:
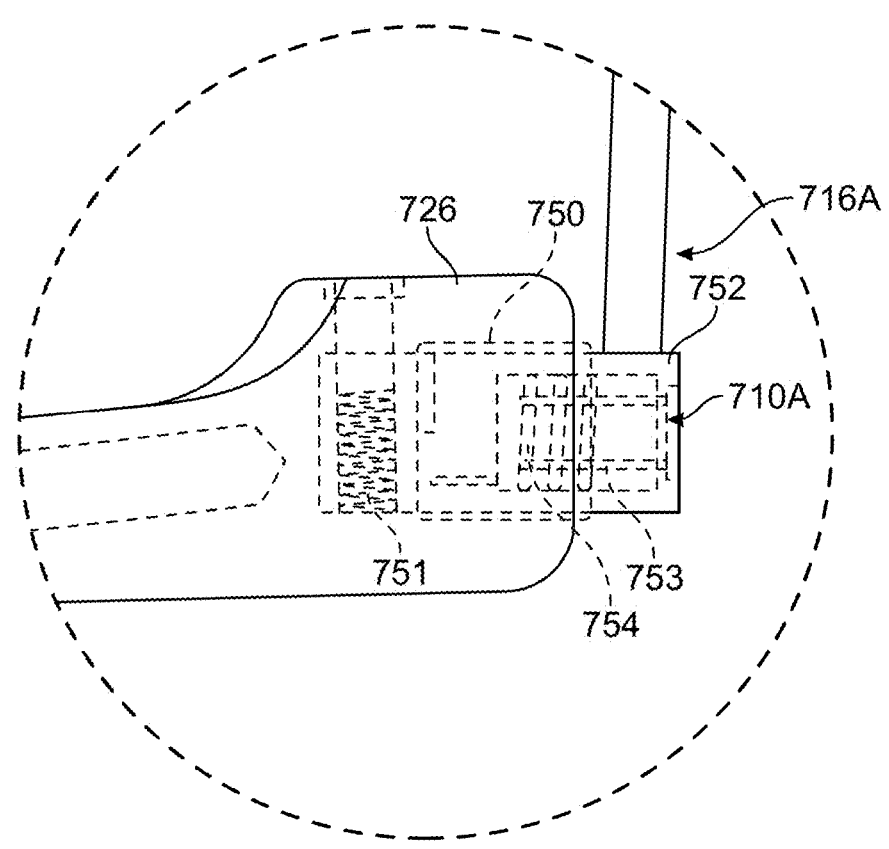
FIG. 17 is an enlarged view of the circled part 17 of FIG. 16, illustrating the left hand hinge connection seated in the outer side of the plastic eyeglass frame in dotted outline.

As best illustrated in FIG. 17, hinges 710A, 710B are similar to the rolling hinge construction of the previous embodiment. Each second hinge or second pivot connection includes a stationary part or pivot housing 750 which is partially or completely housed in a bore or recess in the enlarged side portion 726 of the respective outer edge of frame 712 of the eyeglasses and secured in the recess via screw 751. Each hinge also includes a pivot sleeve or rolling tube 752 which is affixed to the respective temple 716A, 716B of the eyeglasses and rotatably mounted partially inside pivot housing and over a pivot pin 753 secured at one end in pivot housing 750 and rotatably secured at its outer end to the outer end of rolling tube 752. Tension spring 754 acts between the pivot pin 753 and rotatable sleeve 752 in the same manner as spring 418 of the previous embodiments, and is arranged to bias the temple of the eyeglasses into an unfolded configuration when the eyeglasses are being worn by a user.

Figure 11:
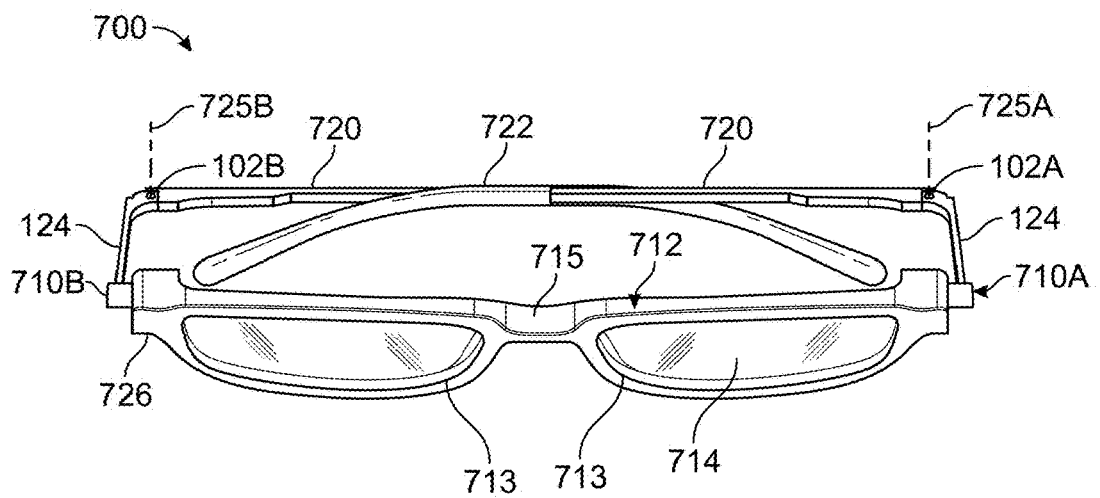
FIG. 11 is a top perspective view of the eyeglasses of FIGS. 9 and 10 in the partially folded condition of FIG. 10.

The stationary part or housing 750 and the rotatable part or tube 752 form a rolling hinge which is operable to fold the temple from the unfolded configuration of FIG. 11 vertically downward into a folded configuration as seen in FIGS. 12 and 13 such that the folded temples are substantially in the same plane as the rim of the eyeglasses and located partially beneath the eyeglass frame 712. Hinges 710A, 710B are similar to the rolling hinges of the previous embodiment as described above in connection with FIGS. 4 and 5, but the hinge arrangement is more compact since the stationary cylinder or part 750 of each hinge is housed within the respective enlarged side portion 726 of the eyeglass frame 713. Only the outer part of the rolling tube or sleeve 752 protrudes out of the side edge of the frame.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A pair of foldable eyeglasses comprising:
   a frame surrounding a pair of lenses, the frame having an upper edge, a lower edge, and opposite left and right outer side edges;
   first and second elongated temples each having a first portion and a second portion including a tip portion for extending over a wearer's ears;
   a first pivot connection between the first portion and second portion of each temple, each first pivot connection defining a first pivot axis generally perpendicular to the respective temple, whereby each second portion is foldable inwardly about the first pivot axis between an unfolded condition generally aligned with the respective first portion and a first folded condition substantially perpendicular to the first portion in which the respective second portion of the first elongated temple overlaps with the other second portion of the second elongated temple and the two overlapped second portions are spaced rearward from the frame; and
   a second pivot connection between each first portion of the first and second elongated temples and a respective outer side edge of the frame, each second pivot connection defining a second pivot axis generally perpendicular to the respective first pivot axis and the respective temple in the unfolded condition, whereby each first portion is foldable about the respective second pivot axis between an unfolded condition extending generally rearward from frame and a second folded condition extending generally downward from the respective pivot mounting portion adjacent the respective outer side edge of the frame;
   whereby when the first portions are folded into the second folded condition with the second portions overlapped and folded into the first folded condition, at least a major portion of the overlapped second portions is located below and substantially in alignment with the frame to form a compact, fully folded condition of the foldable eyeglasses,
   wherein each second pivot connection comprises:
      a stationary protrusion extending perpendicular to the frame;
      a tension spring surrounding the stationary protrusion and configured to keep the first portion of the temple in an unfolded configuration when the second portion of the temple is folded into the first folded configuration;
      a cylindrical member surrounding the tension spring and a portion of the stationary protrusion;
      a rolling tube affixed to the first portion of each elongated temples, the rolling tube contacting the cylindrical member and surrounding an end of the stationary protrusion; and
      a fastener inserted through the rolling tube and engaging the stationary protrusion.

2. The foldable eyeglasses of claim 1, wherein the temples and first and second pivot connections are formed of a metallic material and the frame is made from a plastic material.

3. The foldable eyeglasses of claim 2, wherein the tip portion of each temple includes at least an outer portion made from plastic material.

4. The foldable eyeglasses of claim 2, wherein each outer side edge of the frame of the eyeglasses has an enlarged pivot housing portion and the second pivot connection is at least partially housed in the enlarged pivot housing portion of the frame, the second pivot connection has a stationary part which is affixed in the enlarged pivot housing portion, a rotatable part which is affixed to the temple of the eyeglasses and rotatably engaged with the stationary part, and a tension spring between the stationary part and rotatable part which inclines to keep the temple of the eyeglasses in an unfolded configuration when the eyeglasses are being worn by a user, wherein the stationary part and the rotatable part form a rolling hinge for folding the temple from the unfolded configuration vertically downward into a folded configuration such that the temple is substantially in the same plane as the frame of the eyeglasses.

5. The foldable eyeglasses of claim 4, wherein the stationary part comprises a cylinder which is mounted inside the enlarged pivot housing portion of the frame and a pivot pin extending from an inner end of the cylinder, and the rotatable part comprises a rolling tube which engages inside the cylinder and over the pivot pin, and extends partially out of the enlarged pivot housing portion of the frame, and the tension spring is engaged between the pivot pin and rolling tube.

6. The foldable eyeglasses of claim 1, wherein the eyeglass frame has a front face and a rear face, the first pivot axis is spaced from the rear face of the eyeglass frame and extends generally transverse to the upper and lower edges of the frame, and the second pivot axis lies generally in the plane of the eyeglass frame and transverse to the outer side edges of the eyeglass frame.

7. The foldable eyeglasses of claim 6, wherein each second pivot connection has the stationary portion associated with the respective outer side edge of the frame and the rolling hinge member rotatably mounted relative to the stationary portion, and one end of the first portion of the temple is affixed to the rolling hinge member and is substantially perpendicular to the second pivot axis in both the unfolded and second folded condition.

8. The foldable eyeglasses of claim 7, wherein after folding the temples about the first pivot connection into the first folded condition, the second portion of the temple is substantially parallel to the plane of the frame while the first portion of the temple remains unfolded.

9. The foldable eyeglasses of claim 7, wherein the respective outer side edges of the frame each include a pivot mounting portion, the stationary portion of each second pivot connection is mounted within the pivot mounting portion of the respective outer side edge of the frame, and the respective rolling hinge members protrude outwardly from the respective pivot mounting portions.

10. The foldable eyeglasses of claim 7, wherein the tension spring is configured to unfold the second portion of the temple from the second folded configuration to the unfolded configuration when tension is removed from the tension spring.

11. The foldable eyeglasses of claim 1, wherein the first portion of the temple has a length which is substantially equal to or greater than a distance between the pivot axis of the second pivot connection and the lower edge of the frame.

12. The foldable eyeglasses of claim 1, wherein folding the temples vertically downward from the first folded configuration toward the frame into the second folded configuration via the second pivot connection includes rotating the first portion of the temple around the second pivot axis by approximately 90 degrees.

13. The foldable eyeglasses of claim 1, wherein after folding the temples into the second folded configuration, the first portion of the temple is substantially parallel to the plane of the frame and remains perpendicular to the first pivot axis.

14. The foldable eyeglasses of claim 1, wherein the foldable eyeglasses are configured to be placed inside a collapsible case which operates to fold the foldable eyeglasses from the first folded configuration into the second folded configuration by closing a lid of the collapsible case onto the partially folded temples of the foldable eyeglasses.

15. A foldable eyeglasses and storage case assembly, comprising:

a pair of foldable eyeglasses comprising a pair of lenses, a frame surrounding the pair of lenses and generally defining a plane of the eyeglasses and a pair of temples extending from respective outer edges of the frame, wherein the pair of eyeglasses is in an unfolded configuration when the pair of eyeglasses is being worn by a user; and a collapsible storage case for holding the pair of foldable eyeglasses in a fully folded condition, the case comprising a bottom portion for holding the folded pair of eyeglasses and a top cover configured for movement between an open condition for removal or insertion of the pair of eyeglasses and a closed condition holding the pair of eyeglasses in the fully folded condition;

each temple of the pair of eyeglasses having a first portion and a second portion, and a first pivot connection between the first and second portions defining a first pivot axis;

a second pivot connection between the first portion of each temple of the pair of temples and a respective outer edge of the frame, each second pivot connection defining a second pivot axis perpendicular to the first pivot axis;

wherein the first pivot axis is parallel to and spaced from the plane of the eyeglasses for folding the respective second portions of the pair of temples inwards towards the frame from the unfolded configuration substantially perpendicular to the plane of the eyeglasses and aligned with the respective first portions of the pair of temples into a first folded configuration in which the second portions are substantially parallel to the plane of the frame and the first portions of the temples remain unfolded and transverse to the folded second portions;

each second pivot axis extends outwardly from the respective outer edge of the frame for folding the first portions of the pair of temples downward from the first folded configuration toward the frame into a second, fully folded configuration in which the first and second portions of the respective temples are substantially co-planar with the plane of the frame; and each second pivot connection comprises:

a stationary protrusion extending perpendicular to the frame;

a tension spring surrounding the stationary protrusion and configured to bias the respective first portion of the temple from the second, fully folded condition to the first folded configuration in which the first portions of the temples are unfolded;

a cylindrical member surrounding the tension spring and a portion of the stationary protrusion;

a rolling tube affixed to the first portion of each elongated temples, the rolling tube contacting the cylindrical member and surrounding an end of the stationary protrusion; and a fastener inserted through the rolling tube and engaging the stationary protrusion whereby the tension springs at the second pivot connections are configured to bias the temples outward from the fully folded condition towards the first folded condition and bear against the top cover of the case when the pair of eyeglasses is in the fully folded condition and located inside the case in the closed condition.

16. The assembly of claim 15, wherein the frame is of rigid plastic material and the hinges and temples are of metal.

17. The assembly of claim 16, wherein the second portion of each temple has an outer, ear engaging tip including at least an outer portion of plastic material.

18. The assembly of claim 15, further comprising a third pivot connection between the bottom portion of the collapsible storage case and the lid defining a third pivot axis for rotation of the top cover between the open and closed condition, and a latch for releasably securing the case in the closed condition with the pair of eyeglasses in the second fully folded condition with the folded temples facing outwards towards the top cover, whereby the temples bias the top cover of the case outwards towards an open position when the latch is released.

* * * * *